June 11, 1957   J. SOMOZA   2,795,355
LIQUID DISPENSING SYSTEM
Filed Aug. 24, 1953
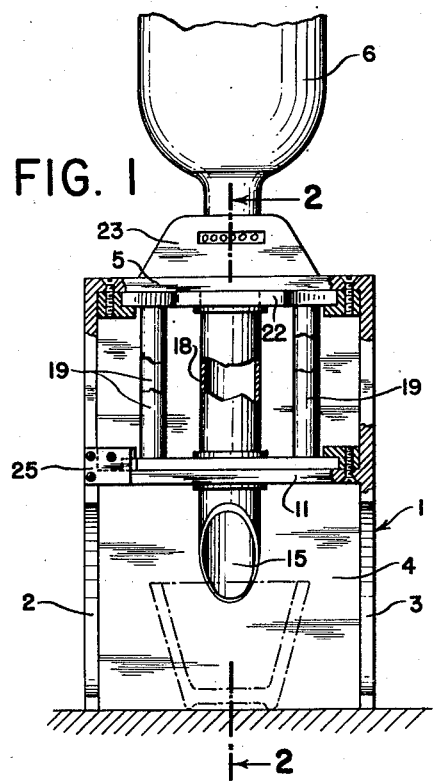
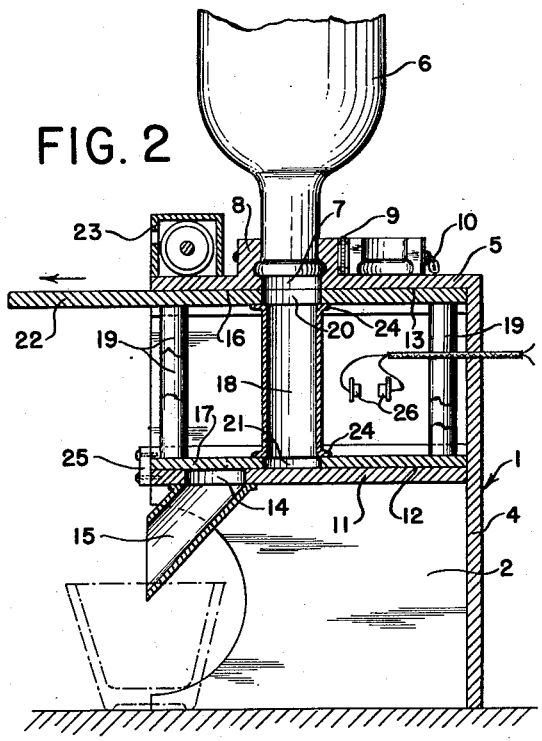
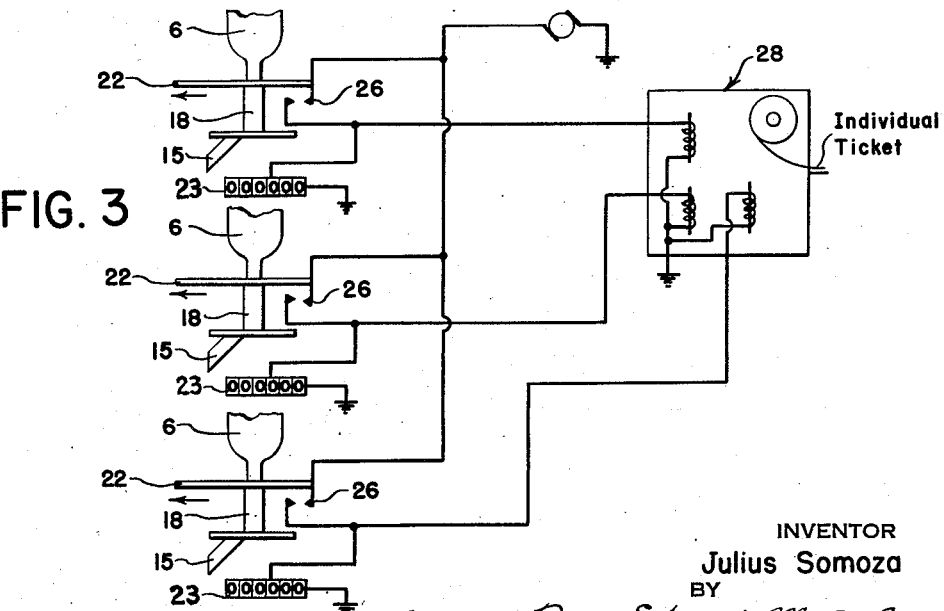
INVENTOR
Julius Somoza
BY
ATTORNEYS

United States Patent Office 2,795,355
Patented June 11, 1957

2,795,355

LIQUID DISPENSING SYSTEM

Julius Somoza, Yonkers, N. Y.

Application August 24, 1953, Serial No. 375,890

7 Claims. (Cl. 222—25)

This invention relates to liquid dispensers and more particularly to a liquid dispensing system for use in restaurants and bars to dispense fruit juices, alcoholic beverages and the like.

The serving of beverages in restaurants and bars entails many real problems for the management of such establishments. Ordinarily, the price per serving of a particular beverage is based upon a unit volume of the beverage calculated to yield a profit at the predetermined price. However, the person serving the liquids to customers is constantly liable, whether intentionally or otherwise, to measure either an excess quantity or an inadequate quantity of liquids per serving. In the former intance, recurring excess quantities served result in a cumulative monetary loss; and in the latter case, recurring short servings result in loss of customer good will. Hand measurements of volumes of liquid is a slow process and often entails considerable waste merely through overflow of the receptacles into which liquid is being measured.

A further problem is that of time required to fill glasses with the correct amount of beverage for individual servings. If this operation is performed slowly enough to avoid spillage, the number of servings which may be made in a given period is materially reduced. On the other hand, if a demand for a large number of servings is to be met in a reasonable time the pouring operation must be performed so rapidly that spillage is practically unavoidable. In many situations it is also necessary that the person pouring and serving the beverages either obtains a price ticket from a register operator whose sole function is to issue tickets for the beverages served, or else interrupt has own activities to issue the ticket himself. Either method adds to the time and expense involved in serving the beverage.

Periodically, of course, it is necessary to make an inventory of the beverages on hand and to determine the value of the servings made since the last inventory. Where the stock is contained in bottles or other small containers, an inventory of partially full bottles is time consuming and necessarily inaccurate. Moreover, there is no dependable way to determine the number of servings withdrawn to provide an accurate check on the amount of money taken in.

I have invented a liquid dispensing system which completely eliminates the possibility of incorrect quantities being served and which substantially reduces the possibility of losses through spilling. Additionally, the liquid dispensing system of my invention keeps a continuing and up-to-the-minute record of the exact quantities of liquids dispensed and the total money value thereof. Further advantages are the saving obtained through elimination of the need for a separate cashier and the reduction of time required for the person serving the beverage to perform the separate step of issuing a price ticket.

The liquid dispensing system of my invention includes measuring and dispensing apparatus for each of a plurality of reservoirs for different beverages. These measuring and dispensing means are capable of withdrawing a predetermined fixed quantity of liquid from the reservoirs. Associated with each dispensing means is a counter or register calibrated to indicate the number of withdrawals from the reservoir supplying the dispensing means and to relate the number of withdrawals to the total capacity of the reservoir. Connected to and cooperating with the dispensing means is a central billing and totalling means for automatically issuing a price-bearing ticket and for accumulating the totals of the prices of beverages withdrawn from all the reservoirs.

For a complete description of the dispensing system according to my invention, attention is directed to the following specification and the accompanying drawings in which:

Fig. 1 is a front elevation of a liquid dispenser;

Fig. 2 is a side elevation partly in section of the liquid dispenser of Fig. 1;

Fig. 3 is a schematic illustration of the liquid dispensing and billing system according to my invention.

Referring now to Fig. 1, a liquid dispenser to be used in my liquid dispensing system comprises a supporting stand 1 having side walls 2 and 3, a rear wall 4 and a top 5. This stand serves to support a reservoir such as an inverted bottle 6 and to enclose the dispenser valve. I provide an aperture 7 in the top and concentric with this aperture there is a split collar 8 adapted to removably receive the end of the neck of the inverted reservoir or bottle. The halves of the split collar are hinged together as at 9 and one of the halves is fixed to the upper surface of top 5. The collar 8 may also be provided with a lock 10 opposite hinge 9 so that the reservoir is removable only by authorized persons having access to the key.

Internally of the supporting frame there is a horizontal member 11. The upper surface 12 of member 11 and the lower surface 13 of top 5 are valve surfaces. Member 11 is provided with an aperture 14 located forwardly of the aperture 7. Aperture 14 communicates with a discharge spout 15 inclined forwardly and downwardly of the aperture 14, the discharge end of which spout is suitably located so that glasses for receiving liquids may be placed thereunder.

Slidably fitted between the surfaces 12 and 13 and side walls 2 and 3 is a movable valve member which comprises the upper valve plate 16, lower valve plate 17 and a measuring conduit 18, the measuring conduit being disposed between the valve plates 16 and 17 and in communication with vertically aligned apertures 20 and 21. The upper surface of plate 16 and the lower surface of plate 17 are carefully finished to have sliding and liquid-tight contact with the lower surface 15 of the top 5 and the upper surface 12 of the member 11, respectively, and are maintained in properly spaced and rigid relation by spacing members 19. The valve member is also provided with a handle 22 which I prefer to attach to or be integral with the plate 16. This handle facilitates manual sliding of the valve member into and out of the supporting stand 1 between the wall 11 and top 5.

The internal volume of conduit 18 determines the quantity of the beverage dispensed. This conduit may be manufactured to have a particular volume and be permanently installed in the dispenser between plates 16 and 17 or a set of replaceable conduits having different volumes may be supplied with each dispenser. In the latter case the conduit having the desired volume may be held in place between the plates by a forced engagement between oversize resilient gaskets 24 concentric with apertures 20 and 21. Such an arrangement will permit the conduits to be easily replaced and will provide liquid-tight seals at the ends of the conduit.

The dispenser is proportioned so that the aperture 20, and therefore conduit 18, is in alignment with aperture 7 when the valve member is fully inserted in the dispenser. In this position liquid may flow from the reservoir into the conduit.

I also provide a suitable stop 25 which will position the valve member so that aperture 21 is in register with aperture 14 when the valve member is drawn forward. In this position liquid in the conduit may flow out through the discharge tube 15.

Internally of the dispensing stand, I provide a pair of electric contacts 26 preferably internally of the supporting frame 1 and adapted to complete an electrical circuit upon the forward motion of the valve member. This may be easily accomplished, for instance, by fixing one of the contacts to the wall 2 of the supporting frame and the other contact to the valve member so that movement of the valve member from its rearmost position in the frame to a forward position brings the contacts together, thereby completing the circuit.

Situated on the supporting stand 1 at an easily visible location there is an electrically actuated counting device 23 of conventional design to be actuated and advanced one unit upon completion of a circuit by contacts 26. The counter is preferably calibrated in terms related to the capacity of a reservoir 6 to be used in conjunction with the liquid dispenser. A mechanically actuated counter may also be used, in which case an appropriate linkage connecting the counter and the valve member of the dispenser must be provided.

Turning now to Fig. 3, I have schematically illustrated my complete liquid dispensing and billing system which includes a plurality of liquid dispensers such as described in connection with Figs. 1 and 2. Cooperatively connected with the dispensers is a register and billing means 28 which is conveniently located relative to all the dispensers included in the system. The billing means is of any conventional printing type such as that shown in the United States Letters Patent to Sobisch, No. 2,662,688, issued December 15, 1953. That it may be used in accordance with my invention, it is, however, simply adapted to have its actuating keys or registers operated or depressed by electromagnetic solenoids. Upon depression of any one of the keys, the billing means operates to print and issue a ticket corresponding to the amount represented by a given key.

In my new dispensing and billing system the switches in the individual dispensers are connected by suitable conductors to the appropriate register actuating solenoids on the billing means so that upon completion of any circuit including the switch, a solenoid, a source of power, and the connections, the register will issue the ticket and add the amount to any previously accumulated total. For example, in Fig. 3, three dispensers are shown and it may be assumed that the prices for the volumes of liquids dispensed by each of them are $.50, $.75, and $.90. The switches in the dispensers are connected in circuit with the solenoids on the billing means for operating the keys for corresponding prices, respectively. Upon actuation of any one of the dispensers to dispense a fixed volume of liquid the switch at the dispenser is closed, whereupon the solenoid in circuit with that switch will depress the key on the billing means and set it in motion to print and issue a ticket for the proper price. Subsequent actuation of this or any of the other dispensers will initiate a similar cycle. It is to be noted that an advantage of this arrangement is that several dispensers may be connected to the same solenoid where the price of the liquid dispensed by each of the several dispensers is the same.

As is customary with cash registers of this type it will maintain a running total of all the prices billed. This feature enables an instantaneous check at any time upon the amount of business done in any prior interval.

In operation each of the dispensers in the system is provided with a reservoir containing a liquid to be dispensed. The reservoir may be especially made for these purposes or it may be the bottle in which the liquid is supplied. A filled reservoir is installed on the dispenser by opening the split collar, inverting the dispenser and inserting the neck of the opened bottle in the collar and thereafter closing the collar and, if desirable, locking it. The dispenser is then placed in an upright position with the reservoir inverted.

It is seen that the conduit may be filled to dispense a measured volume of liquid merely by moving the valve member to its rearmost position so that the aperture 20 is in alignment with the aperture 7 which will permit liquid to flow from the reservoir into the conduit until the latter is filled. In this condition no liquid may escape the conduit since the aperture 21 does not register with the aperture 14. To dispense the volume of liquid in the conduit, it is only necessary to move the valve member forward by handle 22 until the aperture 21 is in alignment with the aperture 14 in which case the liquid in the conduit will flow out through the aperture 14 through the spout 15 and into the glass or other receptacle in position to receive liquid. It will be noted that only that volume of liquid contained in the conduit will be received in the glass inasmuch as movement of the valve member into its forward position places the aperture 20 out of communication with the aperture 7 and the reservoir. Thus, the dispenser has measured out a volume of liquid precisely equal to the volume of the conduit and it is not possible to dispense more than the predetermined amount in a single operation of the dispenser.

In the course of the operation of the valve member to dispense liquid, the contacts 26 complete the circuit to the counter 23 which will advance one unit to show that a certain volume has been withdrawn from the reservoir or remains therein depending on how the counter is calibrated.

Closing of the contacts 26 of the first dispenser also completes the circuit to the billing means which thereupon issues a check bearing the price $.50 and also adds $.50 to the cumulative record of prices on the tickets issued. The ticket is ready for presentation to the customer without further effort on the part of the person serving the beverage to him.

Actuation of any other dispenser will, of course, set in motion of the same sequence of events.

Having described one embodiment of my invention, I do not propose to be limited to the precise details of the liquid dispensing system shown and described, but only by the scope of the subjoined claims.

I claim:

1. A dispensing and accounting system for a plurality of potable liquids, which system comprises a reservoir of known capacity and a locally operable, manually actuated measuring and dispensing means for each liquid for dispensing from the associated reservoir a fixed volume of liquid upon each actuation thereof, said dispensing means including a switch and switch operating means for closing said switch upon each actuation of the measuring means, and a central billing means including ticket printing and issuing means, said billing means having a plurality of registers, each for a different monetary value, an electromagnetic solenoid means for actuating each of said registers, and an operating circuit between the switch of at least one of said measuring means and one of said solenoids, whereby actuation of a dispensing means to withdraw liquid from the reservoir associated therewith completes said operating circuit through said switch, thereby actuating a register and causing said billing means to issue a ticket having printed thereon the price of the liquid withdrawn.

2. A dispensing and accounting system for a plurality of potable liquids, which system comprises a reservoir of known capacity and a locally operable, manually actuated measuring and dispensing means for each liquid for dispensing from the associated reservoir a fixed volume of liquid upon each actuation thereof, said dispensing means including a switch and switch operating means for closing said switch upon each actuation of the measuring means, and a central billing and totaling means including ticket printing and issuing means and price totaling means, said totaling and billing means having a plurality of registers, each for a different monetary value, an electromagnetic solenoid means for actuating each of said registers, and an operating circuit between the switch of at least one of said measuring means and one of said solenoids, whereby actuation of a dispensing means to withdraw liquid from the reservoir associated therewith completes said operating circuit through said switch, thereby actuating a register and causing said billing and totaling means to issue a ticket having printed thereon the price of the liquid withdrawn and to record separately the sum of the printed price and the prices of liquid previously withdrawn from all of said reservoirs.

3. A dispensing and accounting system for a plurality of potable liquids, which system comprises a reservoir of known capacity and a locally operable, manually actuated measuring and dispensing means for each liquid for dispensing from the associated reservoir, a fixed volume of liquid upon each actuation thereof, said dispensing means including a switch and switch operating means for closing said switch upon each actuation of the measuring means, recording means operatively connected to each of said dispensing means for indicating the number of times the fixed volume is withdrawn from its associated reservoir and relating the number of withdrawals to the capacity of the reservoir, and a central billing means including ticket printing and issuing means, said billing means having a plurality of registers, each for a different monetary value, electromagnetic solenoid means for actuating each of said registers, and an operating circuit between the switch of at least one of said measuring means and one of said solenoids, whereby operation of a dispensing means to withdraw liquid from the reservoir associated therewith closes said operating circuit to cause said billing means to issue a ticket having printed thereon the price of the liquid withdrawn and to cause said recording means to advance one count.

4. A dispensing and accounting system for a plurality of potable liquids, which system comprises a reservoir of known capacity and a locally operable, manually actuated measuring and dispensing means for each liquid for dispensing from the associated reservoir a fixed volume of liquid upon each actuation thereof, said dispensing means including a switch and switch operating means for closing said switch upon each actuation of the measuring means, recording means operatively connected to each of said dispensing means for indicating the number of times the fixed volume is withdrawn from its associated reservoir and relating the number of withdrawals to the capacity of the reservoir, and a central billing and totaling means including ticket printing and issuing means and price totaling means, said totaling and billing means having a plurality of registers, each for a different monetary value, electromagnetic solenoid means for actuating each of said registers, and an operating circuit between the switch of at least one of said measuring means and one of said solenoids, whereby operation of a dispensing means to withdraw liquid from the reservoir associated therewith closes said operating circuit to cause said billing and totaling means to issue a ticket having printed thereon the price of the liquid withdrawn and to record separately the sum of the printed price and the prices of liquid previously withdrawn from all of said reservoirs, and to cause said recording means to advance one count.

5. A dispensing and accounting system for a plurality of potable liquids, which system comprises, in combination, a reservoir for each of the liquids to be dispensed, said dispenser being provided with an outlet, a dispenser frame for each reservoir, a fixture for attaching the reservoir at its outlet to said frame, a discharge spout on said frame, a reciprocable valve member in said frame, said valve member including a measuring conduit of known capacity which is open at its opposite ends, and manually operated means for said valve member for selectively placing said measuring conduit in communication at one end with said reservoir outlet while sealing the other end and for placing the other end in communication with said discharge spout while sealing said reservoir outlet, a switch mounted on said frame and constructed and arranged to be closed by each actuation of said valve member, a central billing and totaling means including ticket printing and issuing means and price totaling means, said billing and totaling means having a plurality of registers, each for a different monetary value, an electromagnetic solenoid for actuating each of said registers, and an operating circuit between the switch of at least one of said dispensers and one of said solenoids, whereby operation of a dispensing means to withdraw liquid from the reservoir associated therewith closes said operating circuit, thereby actuating a register and causing said billing and totaling means to issue a ticket having printed thereon the price of the liquid withdrawn and to record separately the sum of the printed price and the prices of liquid previously withdrawn from all of said reservoirs.

6. A dispensing and accounting system according to claim 5 which further comprises recording means operatively connected to each of said dispensing means for indicating the number of times a fixed volume is withdrawn from the reservoir associated with that dispensing means and for relating the number of withdrawals to the capacity of the reservoir.

7. A dispensing and accounting system according to claim 6 in which the recording means is an electrically operated counter and which further comprises an operating circuit including the switch of the dispensing means.

References Cited in the file of this patent

UNITED STATES PATENTS

| | | |
|---|---|---|
| 490,823 | Fowler | Jan. 31, 1893 |
| 847,000 | Helmold | Mar. 12, 1907 |
| 1,064,776 | Rowell | June 17, 1913 |
| 1,198,014 | Dinlany | Sept. 12, 1916 |
| 1,758,999 | Carns | May 20, 1930 |
| 1,890,078 | Enochs et al. | Dec. 6, 1932 |
| 2,328,435 | Eckmeyer et al. | Aug. 31, 1943 |
| 2,348,149 | Reinhardt et al. | May 2, 1944 |
| 2,540,617 | Hazard et al. | Feb. 6, 1951 |

FOREIGN PATENTS

| | | |
|---|---|---|
| 461,748 | Canada | Dec. 13, 1949 |